(12) United States Patent
Gülen et al.

(10) Patent No.: US 10,436,057 B2
(45) Date of Patent: Oct. 8, 2019

(54) GAS TURBINE COMBINED CYCLE FOR HIGH FLEXIBILITY

(71) Applicant: Bechtel Infrastructure and Power Corporation, Reston, VA (US)

(72) Inventors: Seyfettin C. Gülen, Middletown, MD (US); Mark S. Boulden, Middletown, MD (US); Ilya Yarinovsky, Frederick, MD (US)

(73) Assignee: Bechtel Infrastructure and Power Corporation, Reston, VA (US)

( * ) Notice: Subject to any disclaimer, the term of this patent is extended or adjusted under 35 U.S.C. 154(b) by 406 days.

(21) Appl. No.: 15/389,969

(22) Filed: Dec. 23, 2016

(65) Prior Publication Data

US 2018/0179910 A1 Jun. 28, 2018

(51) Int. Cl.
*F01D 19/00* (2006.01)
*F02C 9/18* (2006.01)
*F02C 9/20* (2006.01)
*F01K 23/10* (2006.01)
*F01K 13/02* (2006.01)

(52) U.S. Cl.
CPC ............. *F01D 19/00* (2013.01); *F01K 13/02* (2013.01); *F01K 23/101* (2013.01); *F02C 9/18* (2013.01); *F02C 9/20* (2013.01); *F05D 2220/72* (2013.01); *Y02E 20/16* (2013.01)

(58) Field of Classification Search
CPC .......... F01D 19/00; F01K 13/02; F01K 23/10; F02C 6/00; F02C 6/18; Y02E 20/16
See application file for complete search history.

(56) References Cited

U.S. PATENT DOCUMENTS

| 4,031,404 A * | 6/1977 | Martz ................. F01K 23/108 122/479.1 |
| 5,649,416 A * | 7/1997 | Moore .................... F01D 13/00 60/39.15 |
| 6,178,734 B1 * | 1/2001 | Shibuya ............... F01K 23/106 60/39.182 |
| 6,608,395 B1 * | 8/2003 | Steinway ............... F01D 13/00 290/40 A |
| 2005/0034445 A1 * | 2/2005 | Radovich ............... F01K 13/02 60/39.182 |

(Continued)

OTHER PUBLICATIONS

Robb, D., 2011, Combined Cycles of the Future, Turbomachinery International, 52-1, pp. 24-25.

(Continued)

*Primary Examiner* — Steven M Sutherland
(74) *Attorney, Agent, or Firm* — Duane Morris LLP

(57) ABSTRACT

A combined cycle power generation plant has parallel normally-independent power generation trains, each having a gas turbine in line with a heat recovery steam generator. In a "parked" or spinning reserve operational state, combustion is discontinued at the gas turbine of one power generation train, placed on turning fear. Combustion at the other power train is reduced, preferably to a minimum emissions-compliant level (NOx, CO) of the gas turbine operated at low level combustion. A bypass duct with controllable dampers apportions exhaust from the operating gas turbine to the heat recovery steam generators of both power trains. This maintains an elevated temperature in both heat recovery steam generators and enables fast restart.

15 Claims, 7 Drawing Sheets

(56) References Cited

U.S. PATENT DOCUMENTS

| | | | | |
|---|---|---|---|---|
| 2011/0071692 A1* | 3/2011 | D'Amato | ............... | G05B 17/02 |
| | | | | 700/291 |
| 2012/0317973 A1* | 12/2012 | Gulen | ................... | F01K 23/065 |
| | | | | 60/597 |
| 2013/0091845 A1* | 4/2013 | Li | ............................ | F02C 3/34 |
| | | | | 60/715 |
| 2013/0318987 A1* | 12/2013 | Ekanayake | ............... | F02C 6/00 |
| | | | | 60/772 |
| 2014/0331686 A1* | 11/2014 | Gulen | ..................... | F01K 23/10 |
| | | | | 60/783 |
| 2016/0273396 A1* | 9/2016 | Ekanayake | ........... | F01D 13/003 |

OTHER PUBLICATIONS

Puga, J.N., 2010, The Importance of Combined Cycle Generating Plants in Integrating Large levels of Wind Power Generation, The Electricity Journal, 23-7, pp. 33-43.
Balling, L., 2011, Fast cycling and rapid start-up: new generation of plants achieves impressive results, Modern Power Systems.
Smith, G.R., 2015, GE Rapid Response Plant Design: Operational Flexibility and Transient Emissions Control, GT2015-42512, ASME Turbo Expo 2015, Montreal, Quebec, Canada, Jun. 15-19, 2015.
Peltier, R., 2010, Flexible Turbine Operation is Vital for a Robust Grid, POWER, 154-9, pp. 50-54.
Varley, J., 2014, GE's new all-air-cooled H class turbine, Modern Power Systems, Apr. 2014.

\* cited by examiner

GAS TURBINE COMBINED CYCLE FOR HIGH FLEXIBILITY

BACKGROUND OF THE INVENTION

Field of the Invention

This invention relates to a method and apparatus that enables a combined cycle power plant with multiple gas turbines to operate at a low but still emissions-compliant load in a "parking" or spinning reserve mode, poised for fast restart upon demand.

Pertinent Art

Modern power grid operations advantageously provide some backup power capacity that is dispatchable when needed, for example to supplement less-dispatchable renewable power sources such as wind and solar power, the capacity of which depends on having certain weather and/or sunlight and time of day conditions. See, Robb, D., 2011, *Combined Cycles of the Future*, Turbomachinery International, 52-1, pp. 24-25; and Puga, J. N., 2010, *The Importance of Combined Cycle Generating Plants in Integrating Large levels of Wind Power Generation*, The Electricity Journal, 23-7, pp. 33-43.

"Spinning reserve" concerns such backup capacity. Spinning reserve is generally on-line reserve capacity wherein electric power generation apparatus is available and preferably synchronized to the grid system, ready to be deployed in a short time to meet generate electric demand power to meet a demand, for example within 10 minutes of a dispatch instruction by the Independent System Operator, ISO.

However, for a fossil fuel-fired power plant in general and a natural gas-fired power plant in particular as spinning reserve power sources, the requirements to fulfill these tasks appropriately may be onerous: (i) fast startup capability to respond to system emergencies, (ii) low turndown with minimal heat rate (efficiency) lapse while still meeting the regulatory emissions requirements, and (iii) fast load ramp rates (up and down).

There are several dispatchable backup power options currently in use, e.g., multi-unit simple cycle power plants comprising gas-fired reciprocating engines or aeroderivative gas turbines. These plants preferably are limited as to operating hours due to their low efficiency and, as such, economically not as attractive as larger baseload units on a levelized cost of electricity (LCOE) basis. Combined cycle (CC) power plants with large, heavy-duty industrial gas turbines also have the capability to offer these services but at a significant cost in terms of equipment life and on a limited basis (e.g., limited turndown while remaining in emissions compliance).

Recently, major original equipment manufacturers (OEM) have been offering advanced F, H and J class gas turbines, which seek to offer the best of the both worlds: (i) high efficiency, low cost (i.e., on dollars per kilowatt basis) baseload operation and (ii) fast startup/shutdown and ramp rates with low turndown while emissions-compliant without adverse impact on equipment life and operations and maintenance (O&M) costs. These new offerings with operational flexibility (op-flex) and high efficiency features come under different but similar monikers such as "rapid response", "fast start", etc. See, Balling, L., 2011, *Fast cycling and rapid start-up: new generation of plants achieves impressive results*, Modern Power Systems; Smith, G. R., 2015, *GE Rapid Response Plant Design: Operational Flexibility and Transient Emissions Control*, GT2015-42512, ASME Turbo Expo 2015, Montreal, Quebec, Canada, Jun. 15-19, 2015.

One OEM (now absorbed by another large OEM) differed from the others in its op-flex offering, which was enabled by the unique configuration of its product, i.e., reheat or sequential combustion. Marketed under the phrase Low Load Operation Capability (LLOC), the uniqueness of this gas turbine stemmed from an ability to turn off the second combustor when operating at a low load state. See, Peltier, R., 2010, *Flexible Turbine Operation is Vital for a Robust Grid*, POWER, 154-9, pp. 50-54. The first combustor is kept on at its nominal operating condition (i.e., in lean premix mode, which is the normal operating mode of modern dry-low-NOx (DLN) combustors). Thus, the gas turbine (GT) can be turned down to low loads while still being in emissions compliance. Both NOx and CO emissions stay low if there is complete combustion in the first combustor. Since the steam turbine (ST) is also in operation, the combined cycle plant is able to run in a spinning reserve mode, ready to reload to a new dispatch load (if required by the system operator) with normal ramp rates. FIG. 1 (based on Peltier, R., *Flexible Turbine Operation is Vital for a Robust Grid*, supra) summarizes combined cycle low load "parking" abilities of different technologies, showing gas turbine loading and ramping time, where "MECL" stands for "minimum emissions-compliant load."

When the operator chooses a low load operation (LLO) mode, high pressure (HP) and hot reheat (HRH) steam temperatures are decreased to a target level set by the ST controller at a rate commensurate with allowable thermal stresses. This is accomplished by the desuperheaters (also known as steam attemperators) in the heat recovery steam generator (HRSG). Once the target steam temperatures are reached, the GT is unloaded to 15% at its normal ramp-down rate. In a multi-shaft unit with two or more GTs, the GTs are unloaded simultaneously. At the end of the GT unloading, which takes about 20 minutes, the CC power plant is "parked" at an emissions-compliant load, which is slightly above 20%. The corresponding ST load is 30% (typical minimum stable operating load for a large CC steam turbine is about 20%).

When the LLO mode is deselected and a plant load set-point is chosen by the operator, the GT starts loading at its normal ramp-up rate. Steam temperature gradients are controlled by the desuperheaters to ensure that ST thermal stresses do not exceed allowable limits. Gas turbine full load is reached within 20 minutes (corresponding to about 95% combined cycle (CC) load due to the thermal inertia of the bottoming cycle).

Therefore, as described above, a 2×2×1 CC power plant, rated nominally at 1,000 MWe, can be parked in a low-load (spinning reserve) mode at around 200 MWe output. In comparison, a modern HA/J class GT equipped with a DLN combustor with axial fuel staging (AFS) can turn down to an emissions-compliant load of 35%. See, Varley, J., 2014, *GE's new all-air-cooled H class turbine*, Modern Power Systems, April 2014. Thus, a 2×2×1 CC power plant thus equipped can be turned down to about 40% load or 400 MWe for the CC example above.

The latter arrangement, however, is highly unlikely to be economically feasible for low-load parking or spinning reserve at a time of low power demand and/or reduced electricity tariff. It is practically equivalent to a 1×1×1 CC power plant that is running at full load.

SUMMARY OF THE INVENTION

It is among the objects of the current invention to provide a system and method by which a multi-gas turbine combined cycle, such as a 2×2×1 CC power plant (a combined cycle power plant with two gas turbine-heat recovery steam generator trains (two GT-HRSG trains) and one steam turbine (ST), can be run at an emissions-compliant low load of only about 20%, with a typical heavy-duty industrial gas turbine (GT), normally not a sequential combustion unit, and at the same time to facilitate fast and efficient restart. This object and other objects and advantages are achieved by providing a controllable bypass exhaust path from the gas turbine of one of the substantially parallel GT-HRSG trains, into the heat recovery steam generator of the other of the parallel GT-HRSG trains. The controllable bypass is kept closed in normal operation, such as full load from all GT-HRSG trains, both of which feed the steam turbine. As an example for a 2×2×1 configuration, when moving into low load operations (such as when "parking" the plant), the gas turbine of one of the two trains is kept operating while the other gas turbine is turned off. The operating gas turbine can run at any load above the minimum emissions-compliant load level. The exhaust from the operating reduced load gas turbine is proportioned by the controllable bypass into both HRSG trains, thus keeping warm the HRSG of the train whose gas turbine is off. Both HRSGs feed the steam turbine, so the power production in this parked condition is near the level that would be achieved operating only one conventional GT-HRSG train with the steam generator. However, this manner of low load operation, made possible by operation of the controllable bypass and switching between modes of operation as described, keeps the HRSG of the second GT-HRSG train warm while its GT is off, and enables a fast and efficient restarting of both GT-HRSG trains, for example to bring the entire 2×2×1 plant back to full plant load.

BRIEF DESCRIPTION OF THE DRAWINGS

The invention is illustrated in connection with a number of examples and embodiments but should not be considered limited to the examples shown. The invention is subject to variations and alternatives within the scope of the appended claims. In the drawings.

DETAILED DESCRIPTION OF EXEMPLARY EMBODIMENTS

Figure 1:
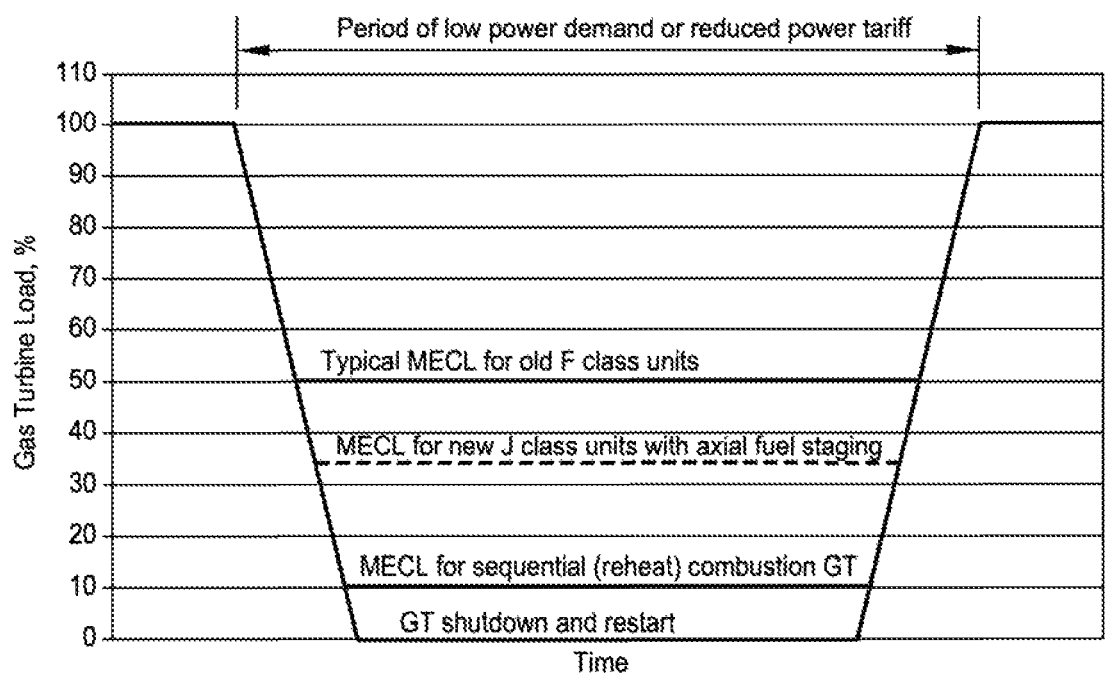
FIG. 1 is a graph comparing the proportion of loading versus time for certain combined cycle gas turbine units changing from full load to shut down or to minimum emissions-compliant loading.
Figure 2:
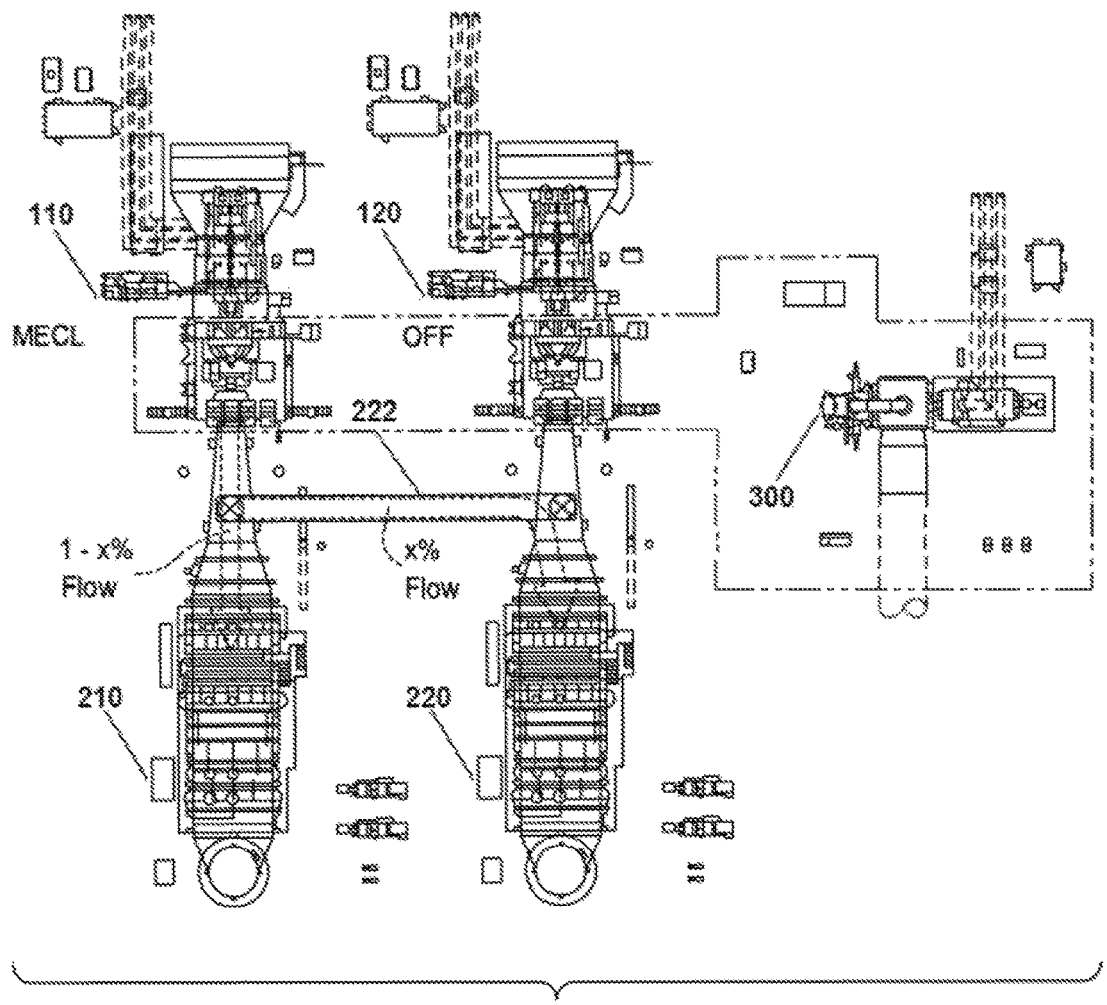
FIG. 2 is a schematic illustration showing a combined cycle (CC) 2×2×1 layout. The 2×2×1 CC layout has two substantially parallel gas turbines (GTs) in line with two respective heat recovery steam generators (HRSG). The 2×2 arrangement (of two GT and HRSG trains) can feed steam to the same steam turbine (ST). The exemplary embodiment in FIG. 2 includes a controllable exhaust diversion path that is configured and operated according to the description below to efficiently manage changes between full load, low load and fast restart operations.

FIG. 1 shows loading and time characteristics for certain combined cycle power generation apparatus, a physical layout of an exemplary embodiment according to the invention being shown in FIG. 2. The layout resembles a typical 2×2×1 combined cycle (CC) power plant with two GT-HRSG trains and one ST. However, the two heat recovery steam generators (HRSG), namely HRSG1 and HRSG2, are connected to one another by a controllable bypass duct at their inlets.

During normal operation (for example at full load or at a selected load above minimum load), the bypass duct is closed by the inlet dampers on both sides. When the operator selects low load operation (LLO), a sequence of operations takes place subject to associated controllers and actuators:
  GT2 shuts down normally and can be placed on turning gear (TG).
  GT1 is ramped down to its low load operation level, preferably to its minimum emissions compliance load (MECL).
  ST is rolled down to a load level consistent with that of one GT operating at MECL, by actuators controlled by the ST controller.
  The dampers that in normal operation were closed and separating the two parallel GT-HRSG paths (isolating the bypass duct at either end) are now opened, and a controlled portion of the GT1 exhaust gas (x %) flow is diverted to the HRSG2. The remainder (100−x %) flows into HRSG1.
  In this state, HRSG2 (including the associated steam pipes and valves) remains warm even though HRSG2's normal gas turbine for regular operation, GT2, is offline.
  The plant runs in this mode until the operator deselects LLO.

Figure 3:
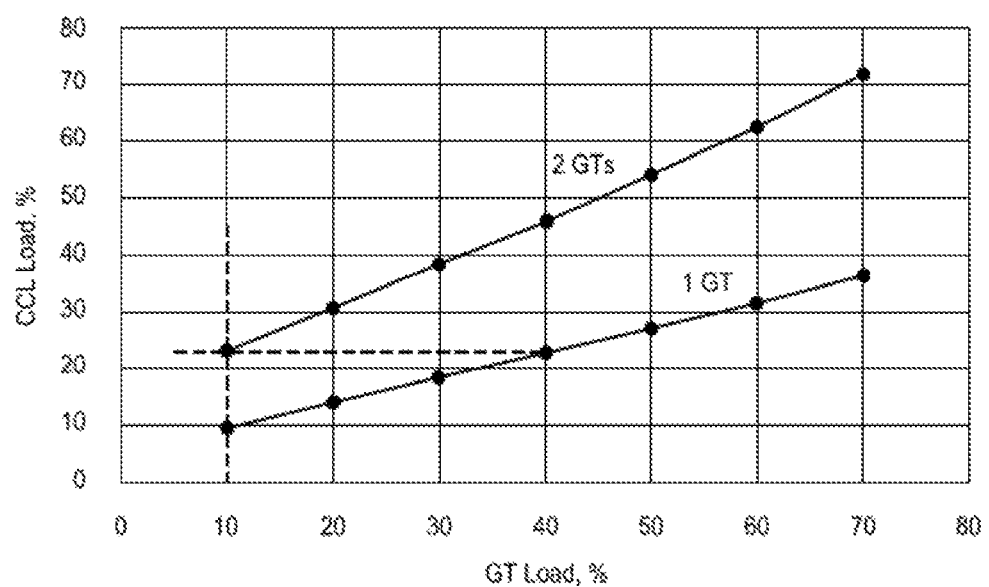
FIG. 3 is a plot of combined cycle load versus gas turbine load when operating one or two gas turbines over a range of load levels.

As seen by the results of a heat balance simulation as shown in FIG. 3, CC plant operation at low load described above is approximately equivalent to normal operation with two GTs running at a load equal to one-fourth of the minimum emissions-compliant load (MECL). In other words, if the MECL for a particular GT is 40%, the described operation is equivalent to two GTs operating at 10%, which corresponds to slightly above 20% CC load. This is sufficient to keep the bottoming cycle warm and therefore in a ready-to-start mode for returning to full load at a normal ramp-up rate. But the two-GT operating mode at 10% load each to keep the both HRSGs warm is not feasible, because the CC plant emissions would be out of compliance.

It is an aspect of the current invention that both HRSGs are kept warm while remaining in emissions compliance, by operating only one GT, preferably at its MECL. This is a feasible technique for achieving certain benefits of the aforementioned sequential combustion units. The invention requires minimal extra capital investment in terms of materials, labor and construction time as compared to existing "fast start" technologies, which can add many millions of dollars to the CC price tag via terminal attemperation (desuperheating) equipment, larger bypass valves and pipes to handle extra steam flow diverted to the condenser, GT and ST control system upgrades, etc.

Nevertheless, the invention and fast start technologies are not mutually exclusive. While the ability of the current invention to be "parked overnight" is an alternative to the existing fast start technology (i.e., overnight shutdown and morning "hot" startup"), a CC plant can advantageously employ both technologies for ultimate flexibility at a relatively modest additional cost. (Note that a fast or rapid start technology cannot meet the current invention's spinning reserve advantages (i.e., the capability of running at very low load and in emissions compliance).

The current invention does not require a unique GT architecture. It can be applied to any CC system with modern GTs equipped with dry-no-NOx (DLN) systems capable of low MECL.

The invention likewise does not provide LLO capability that is only applicable to typical hot and warm start events. For example, LLO operation as described can be selected by the system operator when desirable as dictated by the grid conditions and/or the status of associated renewable generation sources.

The invention/method is exemplified in this description using the framework of a 2×2×1 GTCC, which is a common plant configuration (except the 1×1×1 single- or multi-shaft power block). However, the invention/method can be applied to any combined cycle power plant configuration utilizing multiple gas turbines. It can also be applied to multiple power blocks. In other words, wherever an exhaust bypass path can be controllably established, advantages of the inventive apparatus and method can be exploited. For example, the invention can be configured and operated in varying situations, such as where a booster is needed in the bypass path, because the bypass destination is somewhat distant. The exact configuration can be determined on a case-by-case basis following the general principles outlined herein to achieve the lowest possible combined cycle load while remaining emissions compliant (i.e., minimum number of operational gas turbines).

Figure 4:
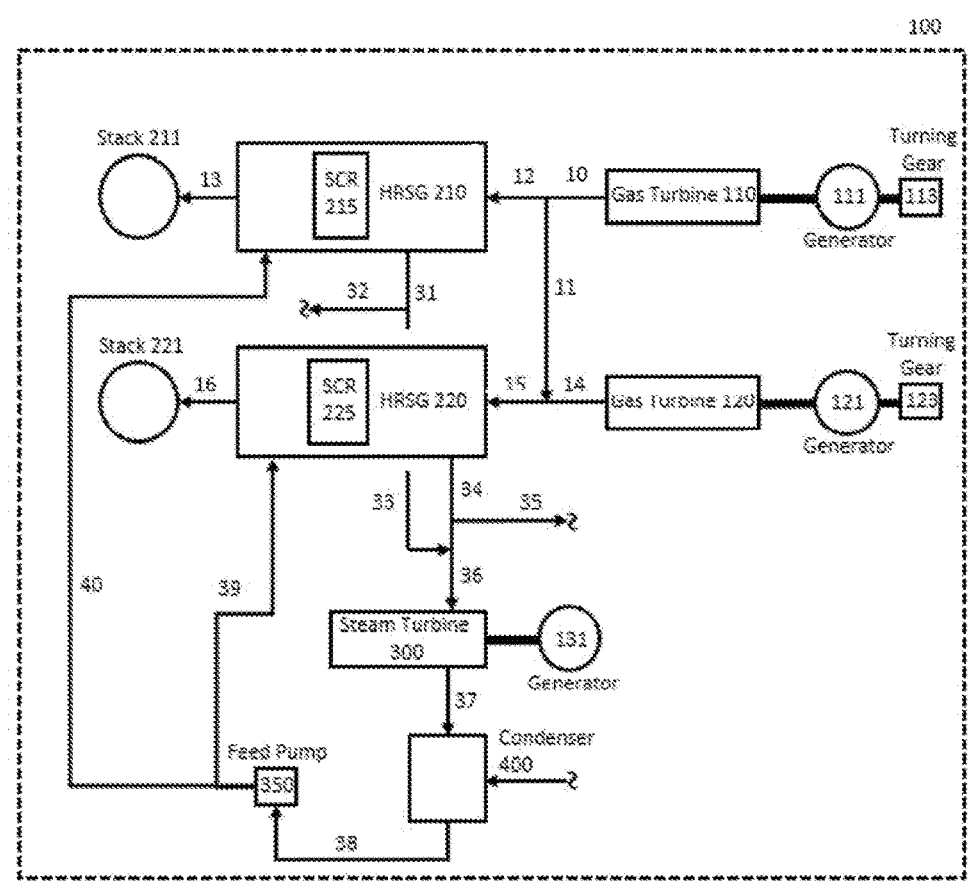
FIG. 4 is a block diagram used herein for discussing the elements of a 2×2×1 gas turbine combined cycle power plant.

FIG. 4 is a block diagram depicting a typical 2×2×1 gas turbine CC power in its bare essentials, and including a bypass route 11 that can be selected by the operator using a controller driven actuator or by other techniques (including manual) to selectively open, close and/or variably set the bypass volume routed from the train of a first GT 110 to the HRSG 220 of the second GT 120, namely when the second GT is not operating and preferably the first GT 110 is operated at or near its MECL.

As seen in the exemplary embodiment of FIG. 4, the CC power plant 100 comprises two GTs, 110 and 120, each of which is connected to its respective HRSGs, 210 and 220 in normal operation. Gas turbines 110 and 120 supply electric power to the grid via their respective generators 111 and 121. Steam generated by HRSGs 210 and 220 is utilized in the ST 300 for additional power generation via its generator 131. In combination with the condenser 400 and feed pump 350, they comprise the bottoming steam cycle of the CC power plant 100.

It will be apparent to those skilled in the art that a modern CC power plant contains additional equipment and water/steam streams, which are not shown in FIG. 4 to simplify the diagram for purposes of discussion. The simplified illustration in FIG. 4 includes the structures and interconnections that enable an operational understanding of the invention in conjunction with the disclosure as a whole.

A key novel element of the system as described herein and shown in FIG. 4, is the GT exhaust gas bypass stream 11. At least in certain operational states, the bypass stream diverts a portion of the exhaust stream of an operational GT, such as GT 110 exhaust gas stream 10, into the HRSG of the other GT, such as the GT 120 exhaust path leading into HRSG 220. In certain exemplary embodiments, the bypass 11 is controllably opened and closed or variably throttled as explained in more detail below. In an embodiment and state wherein the bypass path 11 is fully closed, each of GT 110 and GT 120 are coupled independently to feed their exhaust into their respective HRSGs 210 and 220. If the bypass is opened and both GT 110 and GT 120 are operational, the gas streams from one GT such as GT 110 may flow through the bypass 11 to mix with GT 120 exhaust gas stream 14, and flows into the HRSG 220 (gas stream 15), or vice versa, i.e., depending on pressure difference, the bypass path can support a flow in either direction. Consequently, the GT exhaust gas bypass stream 11 can divert a portion of GT 120 exhaust gas stream 14 to GT 110 exhaust.

According to an aspect of the invention, in a low load operational mode (LLO), at least one of plural gas turbines GT in a configuration as shown is wholly or substantially shut down and at least one other of the plural gas turbines GT is operated at a reduced load but at a load level in which the operating GT is emissions compliant. A portion of the exhaust from at least one said operating GT is routed via the bypass path 11 to the HRSG of at least one of the gas turbines that has been shut down.

More particularly, in an exemplary LLO mode, the following sequence takes place according to the invention, under the initiation of one or both of operator controls, automated control systems and actuators responsive to such control system outputs:

At least one gas turbine (in this example, GT 120) is normally shut down and placed on turning gear (TG).

During this shutdown, an ST controller or controller function ensures that requisite steam turbine 300 unloading and thermal stress control actions are taken. These controller actions may include but are not limited to desuperheating to reduce steam temperatures of streams 31 and 34, diverting a portion of steam generated in HRSGs 210 and 220 to the condenser 400 via bypass streams 32 and 35 and other beneficial steps.

Following the shutdown of GT 120, GT 110 is unloaded by the GT controller down to its MECL. This can be accomplished at its normal ramp-down rate.

The resulting further unloading of the ST 300 is controlled by the ST controller as described above.

When GT 110 substantially reaches its MECL, dampers isolating the bypass line on GT 110 and GT 120 sides are opened in a controlled manner to start a portion of exhaust gas stream 10 to flow via stream 11 to GT 120 exhaust.

At that point, bypass gas stream 11 can mix with the "trickle air/gas flow" stream 14, which is caused by the slow turning of GT 120 by the TG and the mixed gas stream 15 flows into the HRSG 220.

Steam generated in the HRSG 220, stream 34, can either be mixed with stream 33 from the HRSG 210 or bypassed to the condenser 440 via stream 35. The exact amount and conditions of steam generation by the HRSG 220 is a function of the exhaust gas stream 15, which in turn is a function of the amount of bypass gas stream 11. For optimal operations and to establish optimal set points, the exact amount of the bypass stream preferably is determined and planned out in a detailed design phase, for example using thermal inertia calculations and static/dynamic heat balance simulations. The bypass gas stream 11 is then opened or partially closed (throttled) to achieve optimal pressure and flow conditions at one or more operational control points. Alternatively, or in addition, the controller(s)

can be coupled to sensors and arranged to carry out a feedback control procedure to optimize operational conditions according to control objectives.

In most modern CC power plants, stringent environmental regulations dictate installation of selective catalytic converters (SCR) shown as SCR elements 215 and 225 in FIG. 4, to limit NOx and CO emissions, e.g., to reduce such emissions to single-digit levels. For optimal performance, this equipment requires operation above a certain temperature. It is an aspect of the inventive apparatus when operated as described, that the bypass gas stream coming from the GT 110, which is running in MECL, does not present a challenge to functioning of the SCR 225 even in low load operation, in terms of either NOx/CO content or gas temperature. In fact, the invention when operated described is advantageous by keeping the SCR 225 warm and ready to function upon restart of GT 120.

At the end of the sequence described above, the operating mode can be summarized as
a. GT 120 is off-line and on TG;
b. GT 110 is running at MECL; and
c. Part of its exhaust flow bypassed to GT 120 exhaust via bypass stream 11 and, therefrom, into HRSG 220.

The CC power plant operates at a load even slightly lower than that shown FIG. 3 (due to the diversion of a portion of the exhaust gas from the operational GT-HRSG train). In other words, it is "parked" in emissions compliance while generating minimal megawatt-hours and waiting for the system operator command to "restart", i.e., ramp up back to higher load and presumably full load.

It is expected that for the most part, the LLO mode of operation will be assumed at times of low demand and low "spark spread." Various cost/benefit and contractual commitment considerations may enter into when the plant is to be parked in LLO. As such, LLO deployment and duration are initiated by the plant owner and/or system operator on a case-by-case basis depending on the prevailing grid conditions, fuel prices and other commercial considerations.

When the LLO mode is deselected by the system operator, according to one example, the following sequence of steps can take place:

The dampers activating the bypass line on GT 110 and GT 120 sides are closed in a controlled manner to stop the flow of a portion of exhaust gas stream 10 via stream 11 to GT 120 exhaust.

Gas turbine 110 is normally ramped up to full (i.e., 100%) load.

During this process, the ST controller ensures that all requisite steam turbine 300 loading and thermal stress control actions are taken. These controller actions include but are not limited to desuperheating to reduce steam temperatures of streams 31 and 34, diverting a portion of steam generated in HRSGs 210 and 220 to the condenser 400 via bypass streams 32 and 35 and others.

Once GT 110 reaches full load, GT 120 startup process commences. In accordance with NFPA 85, there are two options:
a. HRSG 220 must be purged "at >8% of the baseload flowrate for at least 5 volumes before one can fire/admit gases above the auto-ignition temperature of the fuel gas." This will add around 10-15 minutes the GT 120 startup.
b. Alternatively, GT 120 fuel gas valves (and HRSG 220 duct burner fuel gas valves if applicable) can be certified as "leak-free". In that case, HRSG purge can be skipped. This is a preferred embodiment of the current invention.

GT 120 is brought up to full-speed, no-load (FSNL), synchronized to the grid and then brought up to full load at its normal ramp-up rate.

The resulting further loading of the ST 300 is controlled by the ST controller as described above.

Thus, the CC power plant is "restarted", i.e., it reaches 100% load within about 20 minutes. (Note that, depending on the grid conditions, the system operator may decide to select a lower dispatch load, e.g., 70%, 80%, etc.)

Figure 5:
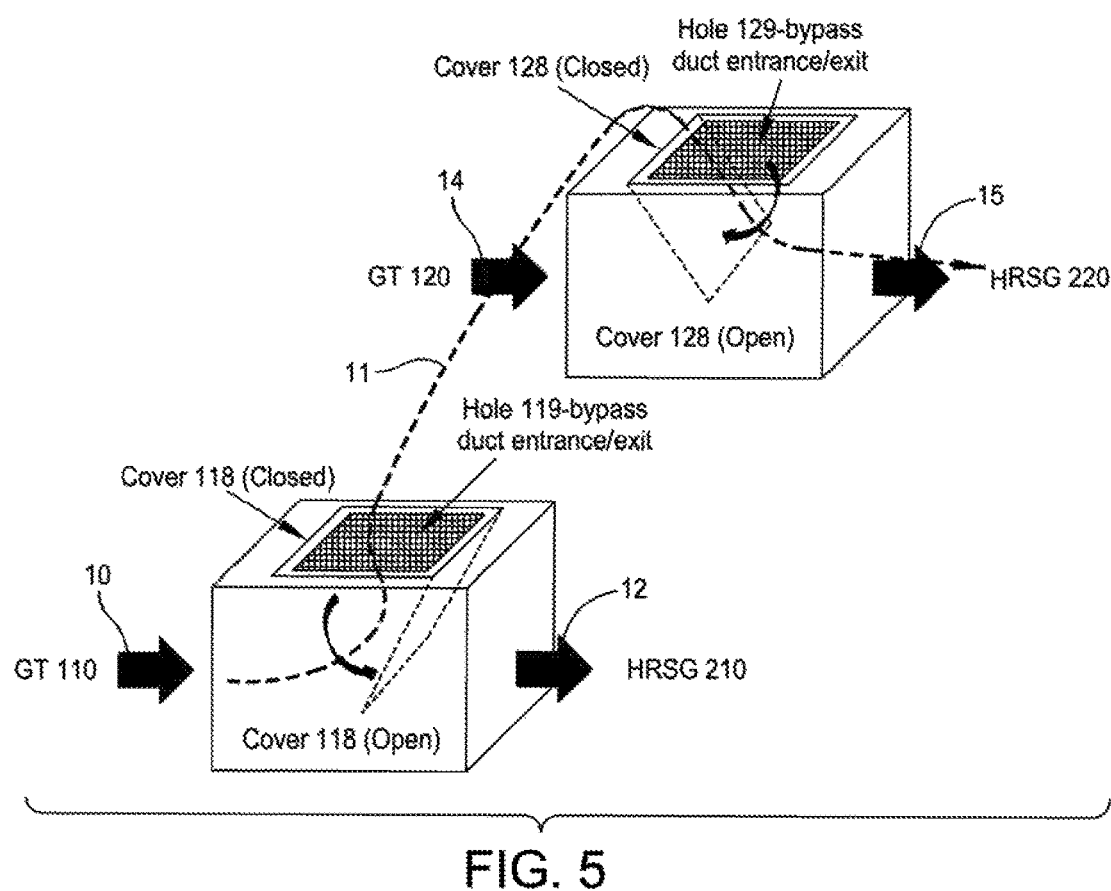
FIG. 5 is a schematic illustration of a damper/cover arrangement for controllably diverting dual gas turbine flow paths to two heat recovery steam generators.
Figure 6:
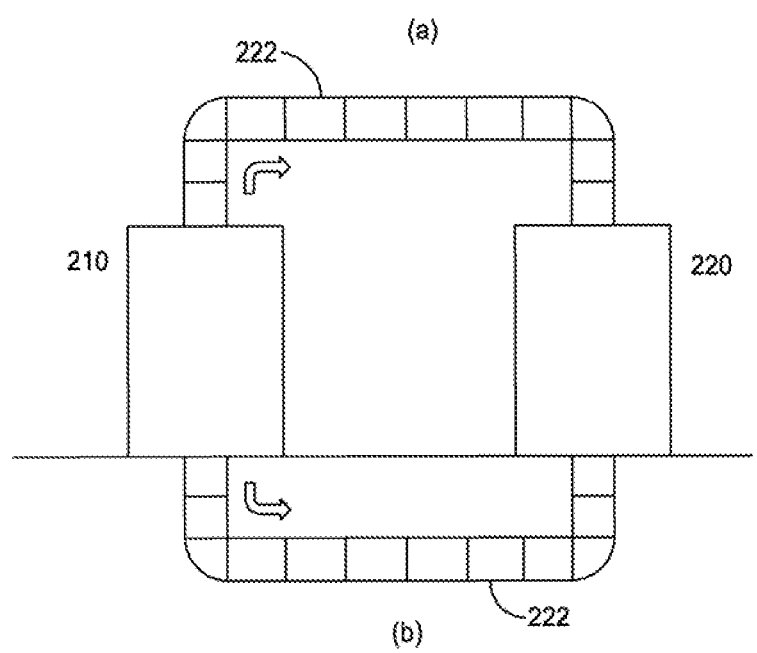
FIG. 6 illustrates two options for situating the exhaust paths as in FIG. 5 (above or below a ground surface).

As mentioned above, the bypass path 11 can carry flow in either direction. It is another aspect of the invention to facilitate the desired bypass flow conditions (stream 11 in FIG. 4) between GTs 110 and 120. According to one embodiment, bi-directional" dampers (covers) are provided at either end of the bypass duct 11. An exemplary arrangement is illustrated in FIG. 5. When the LLO mode commences, cover 118 opens in the direction shown in order (i) to partially block gas flow path to HRSG 210 inlet and (ii) to direct the bypass flow into the bypass duct entrance, hole 119. At the same time, cover 128 opens in the direction shown to direct the bypass gas flow entering through hole 129 into the inlet of HRSG 220. As shown in the embodiment of FIG. 5, the exhaust gas bypass duct 222 is situated above the HRSGs (see FIG. 6 part (a)). Alternatively, it may be economic from a construction materials and labor perspective to place the exhaust gas bypass duct 222 underground (see FIG. 6 part (b)). Although two specific bypass duct paths are shown in FIG. 6, it will be apparent to those skilled in the art that other specific duct and damper layouts are also possible to enable the invention/method described herein to work as described.

The subject invention is significant when one considers what are the alternative technologies, if any, for achieving the same benefits; and how the invention achieves advantages over such alternative technologies.

In terms of pure LLO capability, the only practical competing technology, as described above, is a gas turbine CC power plant using sequential (reheat) combustion gas turbines, i.e., gas turbines with two combustors in series. However, if one takes the view that LLO operation is in essence a modified stop-start cycle (provided that the length of time spent at low load is not unduly long), then one might suggest that existing "rapid response" and "fast start" technologies are also competing technologies.

Gas turbines with multiple combustors in series (reheat configurations) inherently can be run at low loads while staying emissions-compliant. The present invention at least can achieve similar low-load emissions compliance but is based on relatively modest adaptation of gas turbine plant configurations that are well accepted, with plural otherwise independent parallel GT-HRSG flow paths. That adaptation comprises the addition of bypass arrangements as described herein. Plural serial (reheat) gas turbines constitute a small part of existing heavy-duty industrial gas turbine installations, i.e., their worldwide market share is low. The current invention opens up the door to the comparable LLO and restart performance for gas turbines with traditional, single-stage combustor-to HRSG architecture, provided that their DLN combustors allow for emissions-compliant turndowns to load levels of 30 to 40%.

Figure 7:
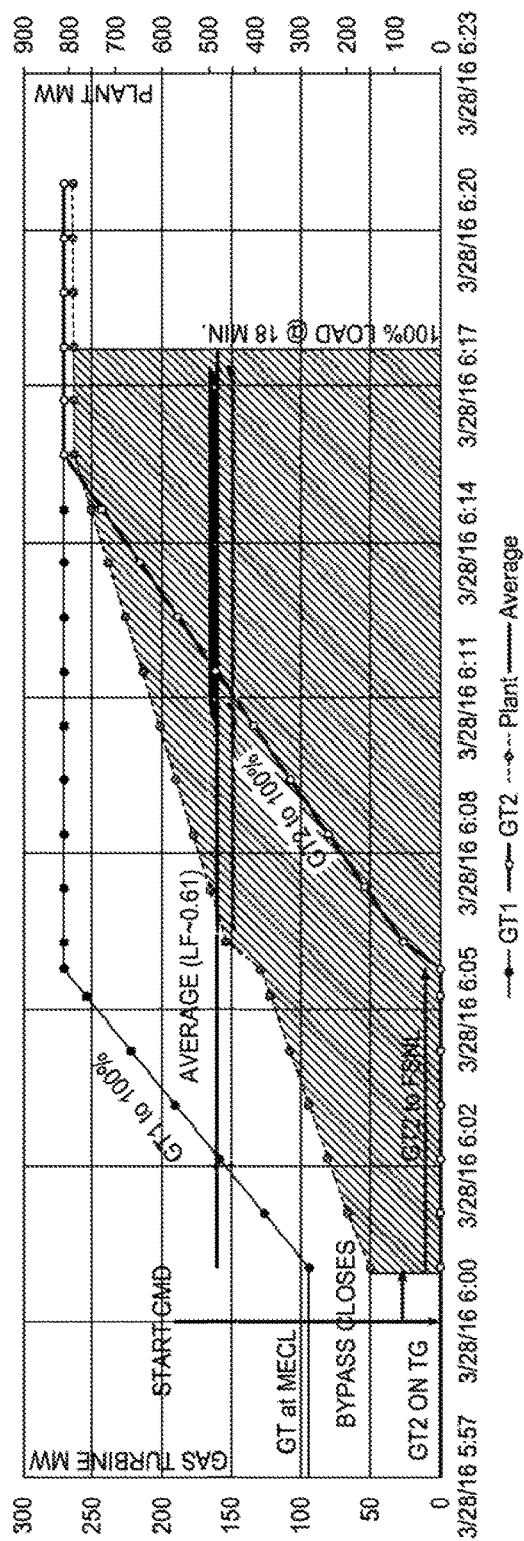
FIG. 7 is a time plot comparing combined cycle plant loading profiles according to the invention.

The current invention's startup sequence is shown in FIG. 7 for a "hot" restart (about 8-12 hours of parking). In this example, At 10 pm, GT1 is brought down to MECL (35% GT load); GT2 is shut down (placed on TG).

15% of GT1 exhaust gas is diverted to GT2 exhaust and, therefrom, into HRSG2 to keep it warm.

For 8 hours, the CC runs at ~19% load (i.e., about 150 MWe for an 800 MWe 2×2×1 GTCC).

During that time the spark spread is low (due to low power tariff).

Scenarios useful for comparison of the invention to its alternatives are summarized Table 1. The system and method of the invention can be used by the operator at any given time period, e.g., during a weekday when solar and/or wind generators are deployed, to satisfy the power demand. In those instances, the invention allows the CC plant to run in a spinning reserve mode. Spinning reserve is a saleable ancillary service, the profits realized being in addition to those from the energy sales.

TABLE 1

Comparison of the invention to non-sequential combustion alternatives

|  | ALTERNATIVE | | | | INVENTION |
| --- | --- | --- | --- | --- | --- |
| GTG 1 | OFF | MECL | MECL | MECL | MECL |
| GTG 2 | OFF | OFF | MECL | MECL | OFF |
| STG LOAD | OFF | >20% | >20% | 20% | >20% |
| CC LOAD | 0% | <20% | >40% | 30% | <20% |
| HRSG2 @ RESTART | COLD | COLD | COLD | COLD | WARM |
| PURGE CREDIT | YES | YES (1) | NA (2) | NA | YES (1) |
| HEAT RATE | NA | 130% | 115% | 165% | 130% |
| SUITABILITY TO LOW LOAD PARKING (SPINNING RESERVE) | NA | YES | NO | MAYBE | YES |
| START TECHNOLOGY | FAST | FAST | NN (3) | NN | NN |
| HOT RESTART (to 100% CC Load) | 53 MIN | <53 MIN | <8 MIN | 8 MIN | 18 MIN |
| WARM RESTART (to 100% CC Load) | 88 MIN | <88 MIN | <9 MIN | 9 MIN | 20 MIN |
| HRSG LIFE IMPACT | HIGHEST | HIGH | LOW | LOW | LOW |
| CAPITAL COST ADDER (4) | HIGH | HIGH | NONE | NONE | LOW |
| BENEFIT-TO-COST (5) | NA | GOOD | WORST | BAD | BEST |

1: Leak-free valves;
2: Not Applicable;
3: Not Necessary;
4: Over Conventional Start Technology
5: Based on net income during LLO and restart (electricity sale minus fuel expense) plus maintenance impact Eight hours later, i.e., the next morning at 6 am, the CC plant ramps up to full load (about 18-20 minutes, with a mean-effective (average) load factor (LF) of 0.60+).

As shown in FIG. 7, according to the invention, the CC plant ramps up to 100% CC load in 18 minutes whereas the existing technology requires about 50 minutes for the same START-100% load sequence. Therefore, for a fair comparison, the full load "waiting" period for the CC plant with the invention, before competing fast start technologies reach full load, is 50−18=32 minutes.

Note that, OEMs typically quote "hot start" times of about 30 minutes with purge credit. This value typically covers the time period between the pushing of START button and steam bypass valves fully closed, at which time plant load is well below 100% due to the thermal inertia. The time required to reach "true" 100% load is significantly longer.

In existing (i.e., conventional) CC technology, one might shut down one GT and run another GT at MECL (if the combustor is capable thereof). The difference between the prior art mode and the current invention is that the prior art second HRSG is "cold" at the time of restart. The second HRSG is hot according to the invention herein. Furthermore, one can add any mid-day spinning reserve applications to the mix, which will increase the count of hot/warm "start-like" events and increase the net annual benefit.

A favorable impact on equipment life stems from the elimination of many full start/stop cycles (hot or warm) via the current invention. This is a very real benefit, although hard to quantify in specific dollar numbers, which is dependent upon the particular long-term service agreement (LTSA) contract offered by the OEM. Such contracts, over 10 or 15 years, can run to values similar to the equipment price (e.g., $70+ million for very large, advanced units) and significantly influenced by the number of starts.

As mentioned above, a particular "fast start" technology and the current invention do not have to be mutually exclusive. While the comparison above is made to highlight the advantage of the current invention (i.e., low-load parking and restart) over the existing technology (i.e., fast start from a stand-still following a total plant shutdown) for a startup scenario, the two technologies can be present in the same CC power plant. This further increases the plant flexibility because the operator can choose between the two modes depending on the length of the shutdown or existing financial picture. In that case, one or the other LLO option might be preferable to park the plant at low load for a longer time, such as four or five days, whereas the other is preferable for shorter term parking (overnight or over the weekend). In certain cases, parking may not be economically preferred due to low spark spread over any stretch of time. A plant with a fast start capability has the capability to quickly respond to emergencies after a limited shutdown (i.e., overnight or weekend). The spinning reserve capability added by the invention combined with this one will make the particular CC plant the ultimate op-flex technology for the grid of the future.

The invention has been described and illustrated using a numbers of exemplary embodiments for purpose of explanation. It must be understood, however, that the invention is not limited to the specific embodiments used as examples, and is capable of other configurations and variations within the scope of the invention as disclosed and as defined in the appended claims.

The invention claimed is:

1. A combined cycle power plant, comprising:
at least two gas turbines operable to combust fuel during operation and supplying torque to at least one electrical generator via a shaft, each of the gas turbines producing an exhaust flow during operation, the exhaust flow being coupled in a flow path to at least one of two or more heat recovery steam generators, each of the heat recovery steam generators being associated with a respective one of the gas turbines in a power train, the heat recovery steam generators producing steam from the exhaust flow of the gas turbines during operation for extraction of further energy by a steam turbine;

operational controls configured to assume a low load operational state of the combined cycle power plant wherein an active one of the two or more gas turbines is operated at a predetermined low load level and another of the two or more gas turbines is substantially shut down;

a bypass duct for defining a flow path for gas turbine exhaust from an outlet of one of the gas turbines in one of the power trains to an inlet of the heat recovery steam generators of the other power trains;

wherein in the low load operational state, the bypass duct conveys a portion of the exhaust flow produced by the active one of the two or more gas turbines, in one of the power trains, to the heat recovery steam generators of the other power trains, the combined cycle power plant further comprising at least one damper at the bypass duct operable for at least one of permitting, preventing and throttling flow of the exhaust flow from said outlet of one of the gas turbines in said one of the power trains to the inlet of the heat recovery steam generators of the other power trains.

2. The combined cycle power plant of claim 1, wherein the at least one damper is configured to apportion the exhaust flow of said one of the gas turbines between the heat recovery steam generators of the other power trains.

3. The combined cycle power plant of claim 1, comprising the at least one damper at each end of the bypass duct, operable to isolate the power trains during a normal mode of operation of the combined cycle power plant.

4. The combined cycle power plant of claim 1, wherein the at least one damper is operable for selecting among plural flow paths for achieving the flow of said gas turbine exhaust to the inlet of the heat recovery steam generators of the other power trains.

5. The combined cycle power plant of claim 1, wherein the operational controls are configured in the low load operational state to operate the gas turbines that are shut down on a turning gear.

6. The combined cycle power plant of claim 1, wherein the operational controls are configured in the low load operational state to operate the active one of the two or more gas turbines substantially at a minimum emissions compliant load level of the associated gas turbine.

7. The combined cycle power plant of claim 1, wherein in the low load operational state, the bypass duct conveys sufficient exhaust gas from the active one of the two or more gas turbines to maintain an elevated temperature in the heat recovery steam generators of the other power trains, thereby limiting a startup time for returning from the low load operational state to a normal operational state wherein the at least two gas turbines are operated.

8. The combined cycle power plant of claim 1 wherein the steam turbine extracts energy in a bottoming cycle from the heat recovery steam generators of both or more of the power trains.

9. A method for operation of a combined cycle power plant having at least two gas turbines operable to combust fuel during operation and supplying torque to at least one electrical generator via a shaft, each of the gas turbines producing an exhaust flow during operation, the exhaust flow being coupled in a flow path to at least one of two or more heat recovery steam generators, each of the heat recovery steam generators being associated with a respective one of the gas turbines in a power train, the method comprising:

switching the combined cycle power plant between modes of operation including at least one normal power generation state and a low load operational state at which the power plant is substantially parked awaiting restarting;

in the normal power generation state, operating the gas turbines and their respective heat recovery steam generators as independent power trains each operating an associated electrical generator and an associated heat recovery steam generator producing steam and extracting energy from the steam by a steam turbine in a bottoming cycle;

in the low load operational state, operating an active one of the gas turbines in one of the power trains in a low load state, while substantially shutting down combustion at the other gas turbines;

coupling a portion of the exhaust from the active one of the gas turbines in said one of the power trains to the heat recovery steam generators of the other power trains, thereby maintaining a temperature of the heat recovery steam generators of the other power trains and facilitating fast transition to the normal power generation state, wherein said coupling of the portion of the exhaust from the active one of the gas turbines to the heat recovery steam generators of the other power trains comprises passing said portion of the exhaust through a bypass duct connecting between the power trains between their respective gas turbines and heat recovery steam generators, and further comprising operating at least one damper associated with the bypass duct for at least one of opening, closing and varying flow through the bypass duct.

10. The method of claim 9, further comprising operating the at least one damper to substantially close the bypass duct in the normal power generation state.

11. The method of claim 10, comprising closing the at least one damper on each end of the bypass duct for isolating the power trains in the normal power generation state.

12. The method of claim 9, comprising operating the at least one damper associated with the bypass duct for selecting among alternative bypass paths.

13. The method of claim 9, wherein the low load state of the active one of the gas turbines in the low load operational state is operated substantially at a predetermined minimum load level for emission of NOx and CO.

14. The method of claim 9, wherein in the low load operational state, the other gas turbines wherein combustion is shut down are placed on a turning gear.

15. The method of claim 9, wherein transitions between the low load operational state and the normal power generation state are controlled by a controller arranged for at least one of timing and effecting actuating steps.

* * * * *